Feb. 15, 1955    J. M. HAIT    2,702,112
FRUIT INSPECTING MEANS
Filed April 15, 1952    4 Sheets-Sheet 1
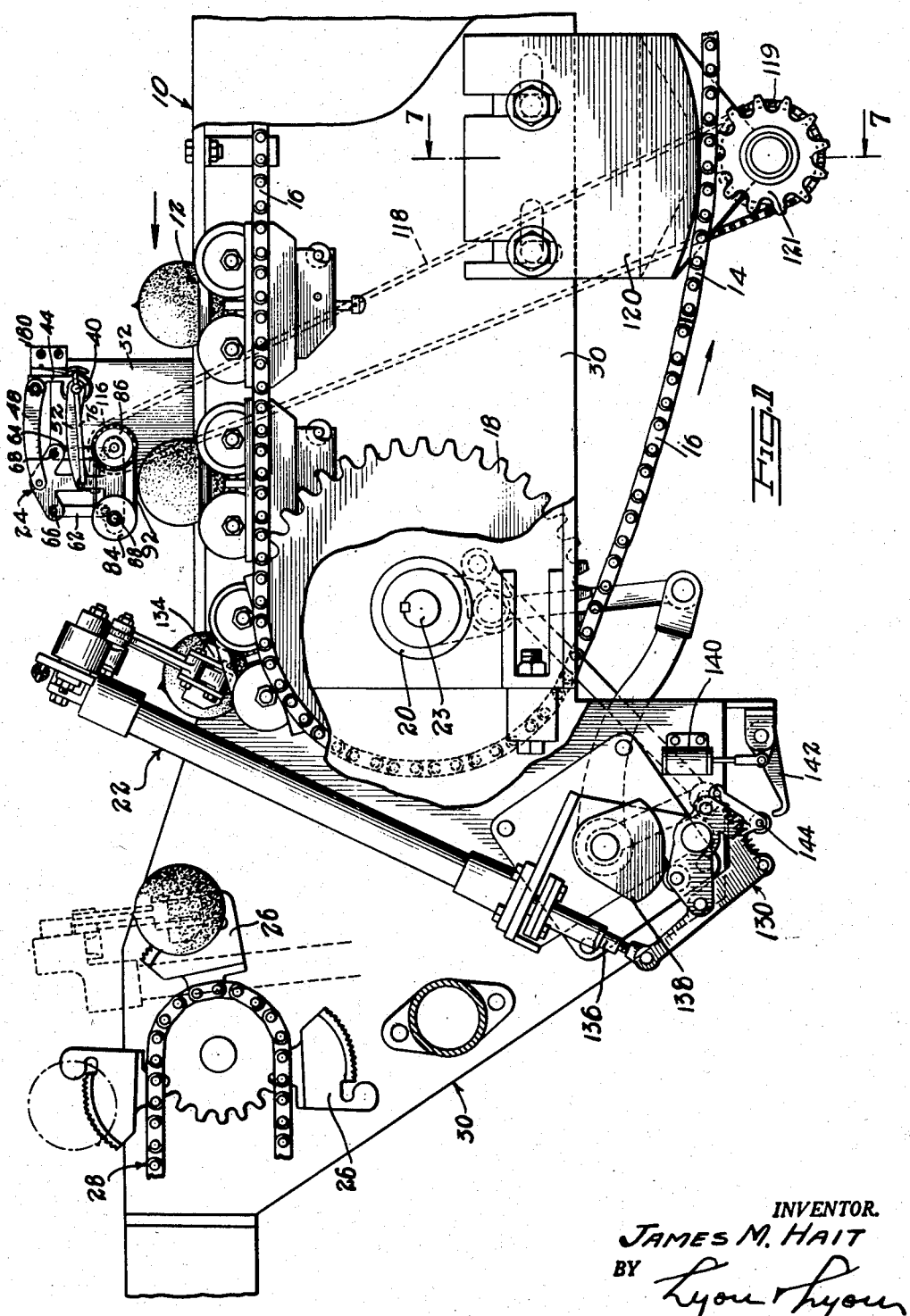
INVENTOR.
JAMES M. HAIT
BY
ATTORNEYS

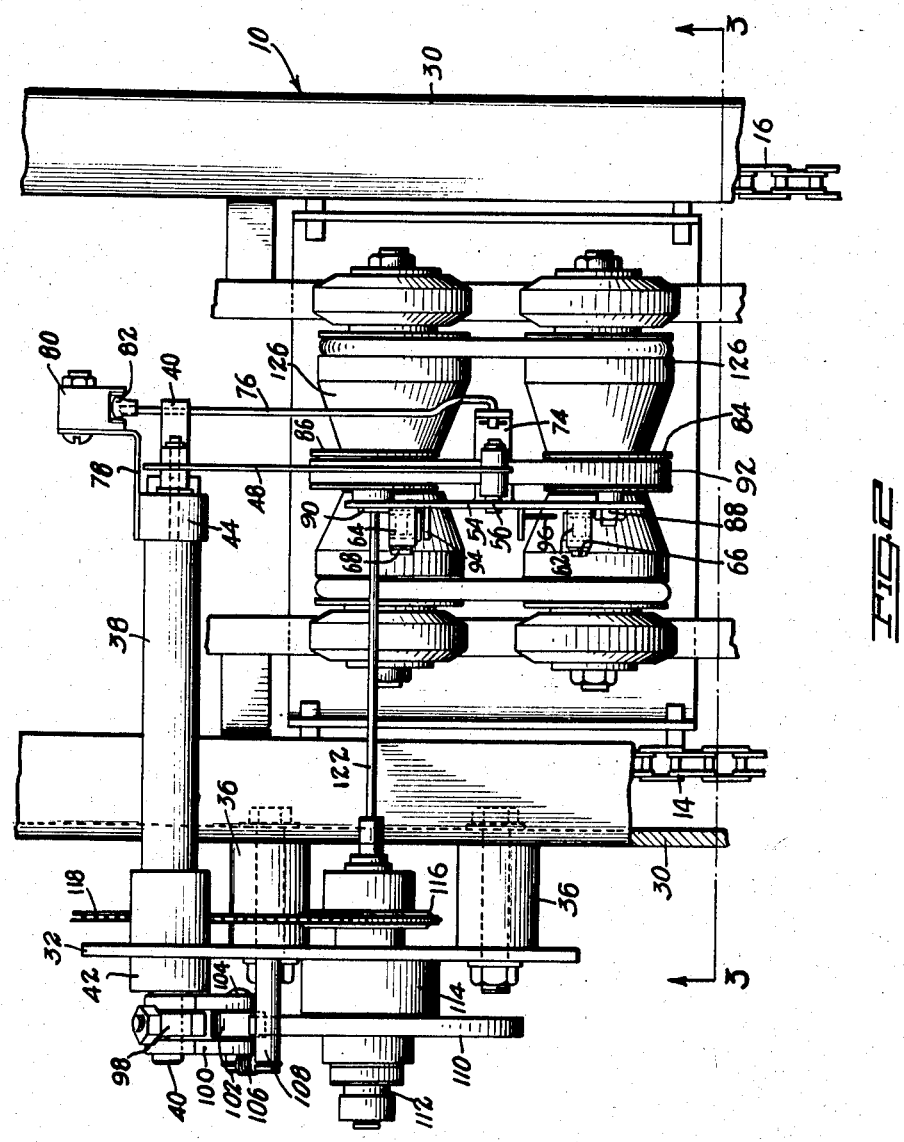

Feb. 15, 1955  J. M. HAIT  2,702,112
FRUIT INSPECTING MEANS
Filed April 15, 1952  4 Sheets-Sheet 3
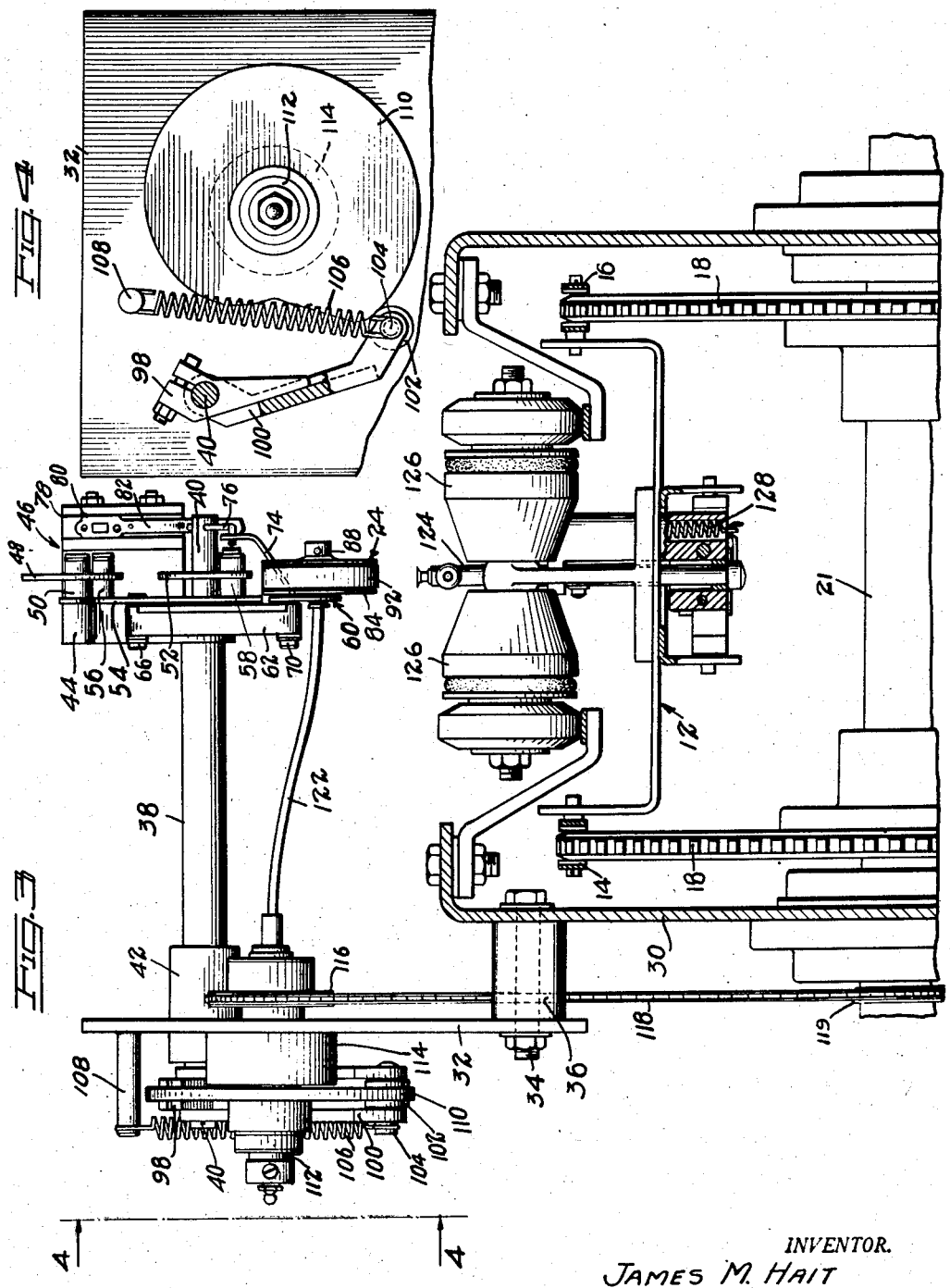
INVENTOR.
JAMES M. HAIT
BY
ATTORNEYS

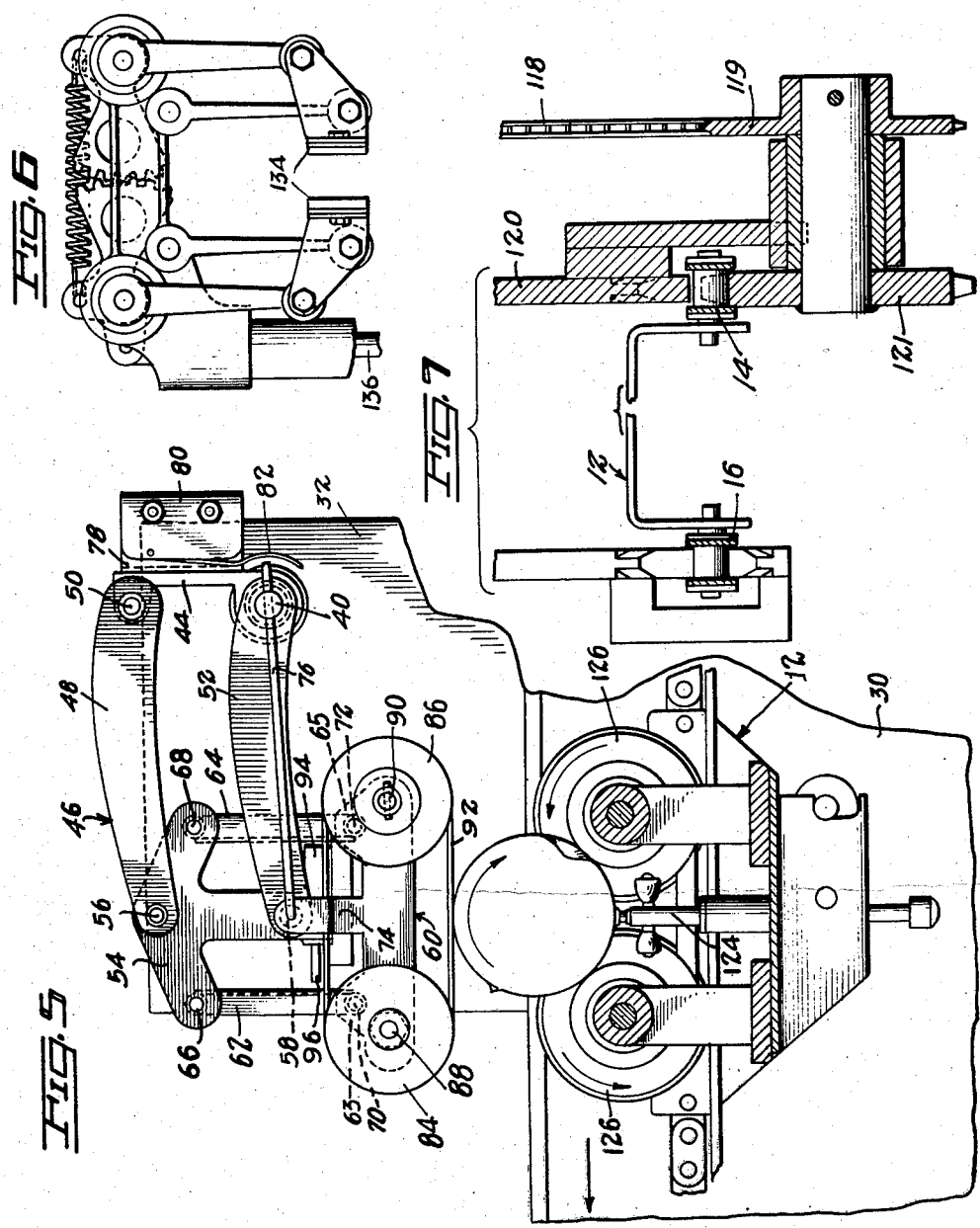

United States Patent Office 2,702,112
Patented Feb. 15, 1955

2,702,112

FRUIT INSPECTING MEANS

James M. Hait, San Jose, Calif., assignor, by mesne assignments, to Food Machinery and Chemical Corporation, San Jose, Calif., a corporation of Delaware Application April 15, 1952, Serial No. 282,353

14 Claims. (Cl. 198—33)

This invention relates to an improved inspecting device for determining the alignment of an indented fruit.

In referring to indented fruits, I refer to fruits such as peaches, apricots and other similar or like fruits which have a calyx indent and a plane of suture passing through the major axis of said indent which serves as a reference plane for the processing of the fruit.

The device hereinafter described is particularly adaptable for the inspecting of peaches to ascertain the alignment of the peach prior to its transfer from an orienting mechanism to a pitting or processing machine. This device is particularly adaptable to use with an orienting machine of the type having continuously moving orienting mechanisms thereon which convey fruit from a supply source to a transferring means and orient the fruit during this conveying step.

It is an object of this invention to provide means for inspecting fruits during the orientation process to ascertain if they are properly aligned for transfer to a processing or pitting machine.

It is a further object of this invention to provide an inspecting device which will inspect the alignment of the fruit during the orientation process without interruption of or obstruction to this orienting process.

It is a further object of this invention to provide a fruit inspecting device which compensates for the variety and size of the fruit inspected and will accommodate large or small fruit without variation in operation of the inspecting device.

Other objects and advantages of this invention will be apparent from the following description.

In the drawings:

Figure 1 represents a fragmentary side elevation of a fruit orienting machine having an inspecting device embodying this invention mounted thereon and also illustrating the fruit transferring means and a portion of the fruit processing machine, certain parts being broken away;

Figure 2 is a top plan view of the fruit inspecting means as mounted on the fruit orienting machine;

Figure 3 is a section taken along the line 3—3 of Figure 2;

Figure 4 is a side view taken substantially along the line 4—4 of Figure 3, certain parts being shown broken away and others being shown in section;

Figure 5 is an enlarged side elevation of the fruit inspecting means and fruit orienting means, some parts being shown in section and others being omitted;

Figure 6 is a fragmentary elevation of the jaws of the fruit transfer means; and Figure 7 is a vertical section taken along the line 7—7 of Figure 1, certain parts being shown in elevation and others being broken away.

Referring now to Figure 1, the fruit orienting machine generally designated 10 may be of any suitable type such as that described in my copending application Serial No. 169,042, filed June 19, 1950. The fruit orienting machine has mounted thereon a plurality of orienting mechanisms generally designated 12 to which the fruit is fed from a hopper or other suitable source (not shown). The fruit orienting mechanisms 12 are supported between spaced endless chains 14 and 16, each of which passes about a sprocket such as 18, which sprockets are spaced apart upon a hollow drive shaft 20, mounted adjacent the forward extremity of the machine 10. Corresponding sprockets are mounted upon a similar driven shaft 21 (Figure 3) at the other extremity of the orienting machine. The shaft 20 is continuously rotated by a suitable source of power so that the sprockets drive endless chain 16 and endless chain 14 carrying the fruit orienting mechanism from the hopper to the transfer means, generally designated 22, and back again to the hopper. The transfer means may be of any suitable type and is herein illustrated as a transfer means similar to that described in my copending application Serial No. 273,415.

The transfer means illustrated in this embodiment comprises generally fruit grasping jaws 134 which are caused to close upon a fruit supported on one of the orienting mechanisms 12 by a downward force upon operating rod 136, in the same manner as described in my copending application Serial No. 273,415. This downward force is controlled by a cam 138 which in turn is actuated by suitable linkages associated with a solid shaft 23. The transfer means is caused to rock between a position wherein the fruit grasping jaws are over a fruit orienting mechanism and are actuated to pick up a fruit from the orienting mechanism to a position where the fruit is released by jaws 134 and delivered to an impaling blade 26. This rocking of the transfer means is controlled by suitable linkage from the shaft 23 as described in my copending application identified above.

Positioned on the frame of the orienting machine 10, prior to the position where the orienting mechanisms pass over the forward sprockets 18, there is mounted a fruit inspecting device generally designated 24. Thus as the fruit passes beneath the inspecting means while being carried by the orienting means 12, its orientation or alignment is ascertained and if the fruit is properly aligned it is delivered to the jaws 134 of transfer means 22, which transfers the fruit to one of the impaling blades 26 of the fruit processing machine. This fruit processing machine may be of any suitable type well known to those skilled in the art, one form of which is illustrated in the patent granted to Albert R. Thompson No. 2,376,526, issued May 22, 1945, for a Continuous Peach Pitter. In the event that the inspecting device discloses that the fruit is improperly aligned for transfer from the orienting machine 10 to the processing machine 28, the transfer means 22 is disabled, preventing transfer to the pitting machine.

The disabling is accomplished by actuating a solenoid 140 which raises claw 142 into the path of a suitable pin 144 mounted upon an element of link mechanism 130, causing said link mechanism to trip, preventing the application of the aforementioned downward force on operating rod 136, as fully described in my copending application Serial No. 273,415, so that the jaws 134 fail to close upon the misaligned fruit.

Mounted upon the side plate 30 of the fruit orienting machine 10 is a support plate 32 (see Figure 3) which is secured thereto by bolt 34 and may be spaced from the side plate 30 by the spacer 36. This support plate projects vertically upward from the orienting machine and has affixed thereto a horizontal support tube 38 which has a shaft 40 journaled therein. The shaft 40 is rotatably mounted in the tube 38, being supported therein by bearings such as 42. Rigidly secured to the tube 38 at the extremity overlying the path of the fruit orienting mechanisms, is a bracket 44 which forms a stationary link in the parallelogram mechanism generally designated 46, see Figure 5. The upper lever 48 of the parallelogram mechanism is pivotally secured to the bracket 44 by pin 50 and the lower lever 52 of the parallelogram mechanism is rigidly secured to the shaft 40.

At the outer extremities of the levers 48 and 52 a T-link 54 is secured thereto, being pivotally mounted to the upper lever 48 about pin 56 and pivotally connected to the lever 52 about pin 58. A carriage 60 is suspended from the T-link by channels 62 and 64 which are pivotally mounted upon the cross bar of the T-link by pins 66 and 68 respectively. The channels 62 and 64, at their lower extremity, are pivotally connected to ears 63 and 65 formed on the upper edge of the carriage 60 about pins 70 and 72, respectively.

The carriage 60 is also formed with an upwardly projecting arm 74 (see Figure 3) which is bent outwardly and upwardly from the carriage and at its uppermost extremity carries the switch actuating arm 76, one extremity of which is bent so as to project through a suitable aperture in the arm 74, and a cotter pin is inserted therein to secure the actuating arm in the proper position. The opposite extremity of the switch actuating arm 76 projects through a suitable aperture in the shaft 40. Secured by a suitable bracket 78 to the bracket 44 is a fruit rejection switch 80 which has depending therefrom a contact arm 82, see Figure 5. It is thus apparent when the carriage moves to the right as seen in Figure 5, the switch actuating arm 76 will slide through the aperture in shaft 40, contact the contact arm 82 of switch 80, and move it to the right a sufficient distance to close the rejection switch 80. When this rejection switch is closed a suitable circuit is closed to actuate solenoid 140 tripping link mechanism 130 and thereby preventing jaws 134 from closing upon a fruit.

Pivotally mounted upon the carriage 60 are pulleys 84 and 86 such as by pins 88 and 90, respectively. Passing about these pulleys is an endless belt 92, which as hereinafter will be described, imparts movement to the carriage when a fruit is improperly aligned. Stops 94 and 96 are formed upon the lower extremity of the T-link 54 to limit the movement of the carriage in either direction.

At the opposite end of the shaft 40 where it projects outwardly from the bearing 42, a shoe 98 is rigidly secured. Straddling the shoe 98 and loosely mounted on the shaft 40 is a lever 100 against which the shoe 98 will normally be held by the weight of the parallelogram mechanism 46. At the outer extremity of the lever 100 a cam follower 102, see Figure 4, is mounted by pin 104. Secured to the pin 104 is a spring 106, the opposite extremity of which is secured to pin 108 on plate 32. The action of the spring urges the lever 100 to pivot in a counterclockwise direction, as seen in Figure 4, so that the cam follower 102 bears against cam 110. The cam 110 is so formed that its rotation will move the cam follower 102 and cause an oscillation of shaft 40, thereby causing the carriage 60 to reciprocate vertically. Thus, as seen in Figure 4, when the area of the cam having a minimum diameter bears against the cam follower, the spring urges the lever 100 to rotate counterclockwise, and the lever 100 bears against shoe 98 causing it to rotate counterclockwise. The shoe is rigidly secured to the shaft 40 causing it in turn to rotate counterclockwise. This counterclockwise rotation of the shaft 40, as viewed from the left side in Figure 3, rotates the lever 52 which is rigidly secured thereto in a clockwise direction, as seen in Figure 5, which raises the parallelogram mechanism and carriage 60. When the cam follower bears against the larger diameter area of the cam, the lever 100 is urged in a clockwise direction, as seen in Figure 4, the weight of the parallelogram mechanism then rotates the shaft 40 in a counterclockwise direction, as seen in Figure 5, or a clockwise direction as seen in Figure 4, thereby permitting lowering of the carriage. The shoe 98 and lever 100 arrangement is adapted to perform a lost motion function for when the belt 92 strikes a fruit, as seen in Figure 5, the carriage and the shoe 98 cease lowering but the lever 100 can be further rotated in a clockwise direction by the cam without effecting additional lowering of the shoe 98 and carriage 60. This permits the mechanism to adapt itself to the inspection of any size fruit.

The cam 110 is secured to a shaft 112, which is journaled in a bearing 114 formed on the support plate 32. A sprocket 116 is rigidly secured to the shaft 112 over which sprocket a chain 118 is looped. The other extremity of the endless chain 118 may pass about a suitable sprocket 119 rotatably supported from a bracket 120 (Figure 7) which is adjustably secured to the side plate 30. Said sprocket 119 is adapted to be rotated by a sprocket 121 secured on a shaft common to the sprockets 119 and 121. The sprocket 121 meshes with the endless chain 14 of the fruit orienting machine 10 and thus rotation of the shaft 20 of the orienting machine not only moves the fruit orienting mechanisms 12 along their path of travel beneath the inspecting device 24 but also imparts rotation to the shaft 112 which permits the inspecting device to be raised and lowered in timed relation with the passage of one of the orienting mechanisms beneath said inspecting device. The cam 110 being rigidly mounted upon the shaft 112, it is driven in timed relationship with the orienting machine. It is readily apparent that by properly forming and positioning the cam 110 upon shaft 112 that the carriage 60 can be caused to lower itself each time an orienting mechanism 12 passes underneath said inspecting device.

Also secured to the shaft 112 is a flexible drive 122, of any conventional type, which at its opposite extremity is connected to pin 90 upon which the pulley 86 is mounted, imparting rotation to the pin 90 and hence to pulley 86. Rotation of pulley 86 causes the belt and the pulley 84 to rotate.

As described in my copending application Serial No. 169,042, filed June 19, 1950, fruit such as peaches are delivered by a hopper to the orienting mechanism 12, which orienting mechanism in this embodiment constitutes four conical rollers spaced apart so as to form a pocket between said rollers wherein a finder 124 projects. The rollers 126 are caused to rotate, which in turn imparts rotation to the fruit. A suitable spring 128 (Figure 3) urges the finder 124 upwardly. When the calyx indent of the fruit is located by the finder 124, the finder projects upwardly into this indent, holding the fruit in a stable position upon the orienting mechanism. When the fruit is thus held, it no longer rotates although the rollers 126 continue to rotate. As the fruit passes along its path of travel carried by the orienting mechanisms 12, it passes beneath the inspecting device 24 which, by the action of cam 110, is permitted to be lowered until the belt 92 strikes the fruit. The belt 92 is driven by flexible drive 122 in a clockwise direction as viewed in Figure 1, that is, so that the belt will move in the same direction as the movement of the fruit and it is adjusted so that the linear velocity of the belt will equal the linear velocity of a properly oriented nonrotating fruit. Thus when a fruit is properly aligned, as illustrated in Figure 1, the fruit does not exert any longitudinal force on the belt 92 and no movement of the carriage 60 results from the contact between the moving belt 92 and the aligned fruit moving with the mechanism 12 since they both have the same lineal velocities.

Referring now to Figure 5 wherein a fruit is illustrated as improperly aligned, that is, where the finder 124 has not located the calyx indent, the fruit is caused, by the rotation of the rollers 126, to rotate. The rollers 126 are caused to rotate in a counterclockwise direction as viewed in Figure 5, thus imparting a clockwise rotation to the fruit. When the clockwise rotating belt 92 strikes this clockwise rotating misaligned fruit, a linear velocity component of rotary movement, due to the rotation of the fruit, will be present at the top surface of the fruit in addition to the linear velocity due to the longitudinal motion of the carriage supported fruit. Therefore the longitudinal velocity vectors of the belt and the fruit are not equivalent, the velocity vector of the fruit being reduced by an amount equal to the linear component of its rotary movement at the point of contact. Hence the fruit exerts a retarding force upon the belt when the carriage 12 is moving to the left as viewed in Figure 5. This retarding force causes the carriage 60 to pivot to the right or rearwardly, as seen in Figures 1 or 5, so that the switch actuating arm 76 strikes the cup-shaped contact 82, causing it to actuate the switch 80. When the switch 80 is thus closed, a suitable circuit is closed, actuating solenoid 140 to trip the link mechanism 130, thus disabling the transfer means 22 as hereinbefore described.

The operation of this invention is as follows. Fruit is fed from a suitable source to the orienting mechanisms 12 which are carried between endless chains 14 and 16. When an orienting mechanism passes beneath the inspecting device 24, said inspecting device is lowered by rotation of cam 110 which is driven in timed relation to the endless chains 14 and 16. The belt 92 is driven at the same lineal speed as the lineal speed of the top surface of a properly aligned fruit so that when the belt is lowered onto a properly aligned fruit no retarding force is applied to the suspended inspection device carriage 60 and it remains in its normal position. The fruit then is carried beyond the inspection device 24 to the furthermost point where the transfer means 22 has rocked. At this point jaws 134 close upon the fruit, lifting it from the orienting mechanism 12 as the latter passes about sprockets such as 18, mounted upon shaft 20. The transfer means 22 is then caused to rock to a position where the jaws 134 deliver the fruit to an impaling blade 26 of the fruit processing machine 28 and there release their hold on the fruit.

If the indent finder 124 fails to locate the calyx indent of the fruit prior to its contacting belt 92, it is still rotating as a result of the rotation of the conical rollers. When a fruit is thus rotating as it contacts belt 92, a thrust to the right, Figure 5, is created on the belt carriage 60 due to the frictional force between the fruit and the belt 92 and the difference in their velocity vectors at the point of contact. The carriage then moves to the right as viewed in Figure 5, closing the rejection switch 80, energizing solenoid 140 and disabling the transfer means 22. The fruit then spills from the orienting mechanism 12, when the mechanism passes over the sprockets on shaft 20, into a suitable receptacle (not shown). The parallelogram support for the belt carriage 60 permits it to move longitudinally with respect to the path of movement of the fruit, actuating the rejection switch with a minimum of resistance. Thus the carriage 60 also readily returns to its normal suspended position sufficiently rapidly to be prepared for inspection of the next successive fruit.

While what hereinbefore has been described is the preferred embodiment of this invention, it is readily apparent that many changes and modifications can be resorted to without departing from the scope of this invention.

I claim:

1. A device for inspecting the alignment of fruit, comprising: means for rotating a fruit until oriented, means for moving a fruit along a path during orientation, means positioned along said path for contacting said fruit, and means for moving said contacting means so that the point of contact of said contacting means has the same lineal velocity in the same direction as the lineal velocity of an oriented fruit moving along said path and a different lineal velocity from an unoriented fruit, and signal means responsive to said different lineal velocity to indicate an improperly oriented fruit.

2. A device for inspecting the alignment of fruit, comprising: means for rotating a fruit until oriented, means for moving a fruit along a path during orientation, pivotally mounted contact means positioned along said path for contacting said fruit, and means for moving said contacting means so that the point of contact of said contacting means has the same lineal velocity in the same direction as the lineal velocity of an oriented fruit moving along said path and a different lineal velocity from an unoriented fruit.

3. A device for inspecting the alignment of fruit, comprising: means for rotating a fruit until oriented, means for moving a fruit along a path during orientation, pivotally mounted contact means positioned along said path for contacting said fruit, means for moving said contacting means so that the point of contact of said contacting means has the same lineal velocity in the same direction as the lineal velocity of an oriented fruit moving along said path and a different lineal velocity from an unoriented fruit, and switch means responsive to pivoting of said contact means when a fruit is improperly oriented and hence rotating.

4. A device for inspecting the alignment of fruit, comprising: means for rotating a fruit until oriented, means for moving a fruit along a path during orientation, a carriage positioned above said path at an inspection station, a belt rotatably mounted upon said carriage and contacting fruit passing beneath said carriage, and rotating means for driving said belt so that the point of contact on said belt contacting said fruit has the same lineal velocity in the same direction as an oriented fruit carried along said path.

5. A device for inspecting the alignment of fruit, comprising: means for rotating a fruit until oriented, means for moving a fruit along a path during orientation, a rocking carriage positioned above said path at an inspection station, a belt mounted upon said rocking carriage and contacting fruit passing beneath said rocking carriage, means for driving said belt so that the point of contact on said belt contacting said fruit has the same lineal velocity in the same direction as the point of contact of an oriented fruit carried along said path, and switch means responsive to rocking of said carriage caused by contact of said belt with a misaligned fruit.

6. A device for inspecting the alignment of fruit, comprising: means for rotating a fruit until oriented, means for moving a fruit along a path during orientation, a rocking carriage positioned above said path at an inspection station, a belt mounted upon said rocking carriage and contacting fruit passing beneath said rocking carriage, means for driving said belt so that the point of contact on said belt contacting said fruit has the same lineal velocity in the same direction as the point of contact of an oriented fruit carried along said path, and means for vertically adjusting said rocking carriage to compensate for the varying sizes of fruit inspected.

7. A device for inspecting the alignment of fruit, comprising: means for rotating a fruit until oriented, means for moving a fruit along a path during orientation, a rocking carriage positioned above said path at an inspection station, a belt rotatably mounted upon said rocking carriage and contacting fruit passing beneath said rocking carriage, rotating means for driving said belt so that the point of contact on said belt contacting said fruit has the same lineal velocity in the same direction as the point of contact of an oriented fruit carried along said path, and means for vertically raising said rocking carriage when no fruit is positioned therebelow and permitting the weight of said rocking carriage to lower said rocking carriage until said belt contacts a fruit.

8. A device for inspecting the alignment of fruit comprising: a plurality of rotated rollers moving along a path and supporting the fruit thereon, a finding element projecting between said rollers stopping rotation of the fruit upon said rollers upon entry of said element into the calyx indent of the fruit, means positioned along said path for contacting said fruit, and means for moving said contacting means so that the point of contact of said contacting means has the same lineal velocity in the same direction as the lineal velocity of an oriented fruit moving along said path.

9. A device for inspecting the alignment of fruit comprising: a plurality of rotated rollers moving along a path and supporting the fruit thereon, a finding element projecting between said rollers stopping rotation of the fruit upon said rollers upon entry of said element into the calyx indent of the fruit, pivotally mounted contact means positioned along said path for contacting said fruit, and means for moving said contacting means so that the point of contact of said contacting means has the same lineal velocity in the same direction as the lineal velocity of an oriented fruit moving along said path, and a different lineal velocity from an unoriented fruit.

10. A device for inspecting the alignment of fruit comprising: a plurality of rotated rollers moving along a path and supporting the fruit thereon, a finding element projecting between said rollers stopping rotation of the fruit upon said rollers upon entry of said element into the calyx indent of the fruit, pivotally mounted contact means positioned along said path for contacting said fruit, means for moving said contacting means so that the point of contact of said contacting means has the same lineal velocity in the same direction as the lineal velocity of an oriented fruit moving along said path and a different lineal velocity from an unoriented fruit, and switch means responsive to pivoting of said contact means when a fruit is improperly oriented and hence rotating.

11. A device for inspecting the alignment of fruit comprising: a plurality of rotated rollers moving along a path and supporting the fruit thereon, a finding element projecting between said rollers stopping rotation of the fruit upon said rollers upon entry of said element into the calyx indent of the fruit, a carriage positioned above said path at an inspection station, a belt rotatably mounted upon said carriage and contacting fruit passing beneath said carriage, and rotating means for driving said belt so that the point of contact on said belt contacting said fruit has the same lineal velocity in the same direction as an oriented fruit carried along said path.

12. A device for inspecting the alignment of fruit comprising: a plurality of rotated rollers moving along a path and supporting the fruit thereon, a finding element projecting between said rollers stopping rotation of the fruit upon said rollers upon entry of said element into the calyx indent of the fruit, a rocking carriage positioned above said path at an inspection station, a belt mounted upon said rocking carriage and contacting fruit passing beneath said rocking carriage, means for driving said belt so that the point of contact on said belt contacting said fruit has the same lineal velocity in the same direction as the point of contact of an oriented fruit carried along said path, and switch means responsive to rocking of said carriage caused by contact of said belt with a misaligned fruit.

13. A device for inspecting the alignment of fruit comprising: a plurality of rotated rollers moving along a path and supporting the fruit thereon, a finding element projecting between said rollers stopping rotation of the fruit upon said rollers upon entry of said element into the calyx indent of the fruit, a rocking carriage positioned above said path at an inspection station, a belt mounted upon said rocking carriage and contacting fruit passing beneath said rocking carriage, means for driving said belt so that the point of contact on said belt contacting said fruit has the same lineal velocity in the same direction as the point of contact of an oriented fruit carried along said path, and means for vertically adjusting said rocking carriage to compensate for the varying sizes of fruit inspected.

14. A device for inspecting the alignment of fruit comprising: a plurality of rotated rollers moving along a path and supporting the fruit thereon, a finding element projecting between said rollers stopping rotation of the fruit upon said rollers upon entry of said element into the calyx indent of the fruit, a rocking carriage positioned above said path at an inspection station, a belt rotatably mounted upon said rocking carriage and contacting fruit passing beneath said rocking carriage, rotating means for driving said belt so that the point of contact on said belt contacting said fruit has the same lineal velocity in the same direction as the point of contact of an oriented fruit carried along said path, and means for vertically raising said rocking carriage when no fruit is positioned therebelow and permitting the weight of said rocking carriage to lower said rocking carriage until said belt contacts a fruit.

References Cited in the file of this patent

UNITED STATES PATENTS

| | | |
|---|---|---|
| 2,254,594 | Carroll | Sept. 2, 1941 |
| 2,540,020 | Waters | Jan. 30, 1951 |
| 2,594,361 | Skog | Apr. 29, 1952 |
| 2,609,094 | Fry | Sept. 2, 1952 |

FOREIGN PATENTS

| | | |
|---|---|---|
| 392,110 | Germany | Mar. 15, 1924 |